(12) United States Patent
Liu et al.

(10) Patent No.: US 10,272,483 B1
(45) Date of Patent: Apr. 30, 2019

(54) WHEEL BLANK OUTER RIM SCRIBING DEVICE

(71) Applicant: CITIC Dicastal CO., LTD., Qinhuangdao, Hebei (CN)

(72) Inventors: Huiying Liu, Qinhuangdao (CN); Xin He, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 0 days.

(21) Appl. No.: 15/894,078

(22) Filed: Feb. 12, 2018

(30) Foreign Application Priority Data

Dec. 22, 2017 (CN) .......................... 2017 1 1404046

(51) Int. Cl.
*B21D 53/30* (2006.01)
*B21D 53/26* (2006.01)

(52) U.S. Cl.
CPC ............ *B21D 53/262* (2013.01); *B21D 53/30* (2013.01); *B23B 2215/08* (2013.01)

(58) Field of Classification Search
CPC ......... B23B 5/28; B23B 5/32; B23B 2215/08; B21D 53/30
See application file for complete search history.

(56) References Cited

U.S. PATENT DOCUMENTS

2006/0042091 A1* 3/2006 Luschei .................... B23B 1/00
29/894.35

FOREIGN PATENT DOCUMENTS

DE        527156 C  *   6/1931  ............... B23B 5/28
DE     2620393 A1  * 11/1977  ............... B23B 5/28

* cited by examiner

*Primary Examiner* — Alan Snyder
(74) *Attorney, Agent, or Firm* — Cooper Legal Group, LLC

(57) ABSTRACT

A wheel blank outer rim scribing device is composed of a wheel positioning and clamping system, an upper auxiliary system, a lower auxiliary system, a rim scribing system and a vision detection system. The wheel positioning and clamping system completes positioning of a wheel on a roller bed, clamping and rotating drive; the upper auxiliary system improves the axial positioning precision and power assisting rotation of the wheel; the lower auxiliary system improves the radial positioning precision and power assisting rotation of the wheel; the rim scribing system completes groove ridge machining of the outer rim of the wheel; and the vision detection system detects blanks having insufficient outer rim machining allowance. The device not only can scribe ridges on the outer rim of the wheel, but also can check the blanks having insufficient outer rim machining allowance.

2 Claims, 5 Drawing Sheets

WHEEL BLANK OUTER RIM SCRIBING DEVICE

CROSS-REFERENCE TO RELATED APPLICATIONS

The present application claims benefit of Chinese Patent Application No. 201711404046.X, filed on Dec. 22, 2017, the contents of which are hereby incorporated by reference in its entirety.

BACKGROUND

With wide application of aluminum alloy wheels, the category and the model are increasing. Some products are a little different and even same in front spoke shape, but different in size, wheel width and offset, e.g., 16×6.0 inches and 17×6.0 inches, 19×8.5 inches and 19×9.0 inches. The front shape is identical, but the sizes and widths of the wheels are different, so the wheels are unlikely to fast distinguish from the appearance only. In actual machining, some operators use blanks mistakenly to cause the accident of colliding with machine tools. On the basis of the current situation, the present patent provides a wheel blank outer rim scribing device, which can be used for machining groove ridges on a ring of outer rim of a wheel blank, and an operator can fast distinguish similar blanks via the number of the ridges, so that machining accidents caused by mistakenly using blanks are avoided; moreover, the device can also be used for recognizing blanks having large rim deformation.

SUMMARY

The disclosure relates to the technical field of wheel blank machining, and specifically, to a wheel recognizing device.

The aim of the disclosure is to provide a wheel blank outer rim scribing device, which can be used for machining groove ridges on a ring of outer rim of a wheel blank, an operator can fast distinguish similar blanks via the number of the ridges, moreover, the device can also be used for recognizing blanks having large rim deformation to screen the blanks having insufficient outer rim machining allowance.

In order to fulfill the above aim, the technical solution of the disclosure is:

A wheel blank outer rim scribing device is composed of a frame, an adjusting guide rail, an adjusting cylinder, a left sliding table, a right sliding table, a first gear rack, a left cylinder, a right cylinder, a first guide post, a lifting table, a roll shaft support, a roll shaft, a roller, a driven wheel, a servo motor, a driving wheel, a clamping cylinder, a clamping guide rail, a left sliding plate, a right sliding plate, a second gear rack, drive motors, clamping wheels, a side cylinder, a side guide rail, a side lifting table, a first feeding cylinder, a first support plate, first guide rails, a first sliding block, electric cylinders, a tool apron, a scribing tool, a second feeding cylinder, a second support plate, second guide rails, a second sliding block, a vision sensor, upper cylinders, second guide posts, a feeding platform, an upper servo motor, a shaft, a rotating disk and a pressure plate.

The wheel blank outer rim scribing device is composed of a wheel positioning and clamping system, an upper auxiliary system, a lower auxiliary system, a rim scribing system and a vision detection system. The wheel positioning and clamping system completes positioning of a wheel on a roller bed, clamping and rotating drive; the upper auxiliary system improves the axial positioning precision and power assisting rotation of the wheel; the lower auxiliary system improves the radial positioning precision and power assisting rotation of the wheel; the rim scribing system completes groove ridge machining of the outer rim of the wheel; and the vision detection system detects blanks having insufficient outer rim machining allowance, and the five systems are organically combined together to jointly machine ridges on the outer rim of a wheel blank.

The output end of the clamping cylinder is connected with the left sliding plate, the left sliding plate and the right sliding plate are mounted on the clamping guide rail and connected with each other via the second gear rack, two drive motors are mounted on both the left sliding plate and the right sliding plate, and a clamping wheel is mounted at the output end of each drive motor. When the clamping cylinder drives the left sliding plate to move, the right sliding plate moves synchronously under the action of the second gear rack, so that the wheel can be positioned and clamped by the four clamping wheels; the drive motors drive the clamping wheels to rotate, and the wheel can be driven to rotate under the action of friction. This is the wheel positioning and clamping system, which completes positioning of the wheel on the roller bed, clamping and rotating drive.

The four upper cylinders are fixed right above the frame, and the output ends of the cylinders are connected with the feeding platform to control the feeding platform to move up and down under the action of the second guide posts. The upper servo motor is mounted on the feeding platform, the output end of the upper servo motor is connected with the rotating disk, and the plastic pressure plate is fixed on the rotating disk. After the wheel is positioned and clamped via the positioning and clamping system, the upper cylinders are started to drive the pressure plate to move down, and the lip end face of the wheel is compressed by the pressure plate, so that axial run-out of the wheel is eliminated, and the axial positioning precision of the wheel is improved; and the upper servo motor drives the pressure plate to rotate, thus assisting the wheel in rotating. This is the upper auxiliary system, which improves the axial positioning precision and power assisting rotation of the wheel.

The output end of the adjusting cylinder is connected with the left sliding table, and the left sliding table and the right sliding table are mounted on the adjusting guide rail and connected with each other via the first gear rack; the left cylinder is mounted on the left sliding table and controls the lifting table to move up and down under the guidance of the first guide post, the roll shaft support is fixed on the lifting table, the roll shaft is mounted on the roll shaft support, and the roller is mounted on the roll shaft. The servo motor is fixed on the lifting table, the driving wheel is mounted at the output end of the servo motor, the driven wheel is mounted on the roll shaft, and the driving wheel is connected with the driven wheel via a drive belt. The structures on the right sliding table and the left sliding table are completely identical, the left cylinder and the right cylinder are simultaneously started to drive the left roller and the right roller to synchronously ascend to the inner rim of the wheel, the adjusting cylinder is started to drive the left sliding table and the right sliding table to move synchronously, and the rollers on the two sides contact the inner rim of the wheel, so that radial positioning of the wheel is strengthened and the radial positioning precision of the wheel is improved; and the servo motor drives the roller to rotate, thus assisting the wheel in rotating. This is the lower auxiliary system, which improves the radial positioning precision and power assisting rotation of the wheel.

The side cylinder is mounted on the right of the frame, the output end of the side cylinder is connected with the side lifting table, the side cylinder controls the up-and-down motion of the side lifting table under the guidance of the side guide rail, the first support plate is fixed on the side lifting table, the two first guide rails are fixed on the bottom plane of the first support plate, the first feeding cylinder is fixed on the side of the first support plate, the output end of the first feeding cylinder is connected with the first sliding block, the first sliding block is mounted on the first guide rails, the three electric cylinders are fixed on the first sliding block at equal intervals from top to bottom, the output ends of the electric cylinders are connected with the tool apron, the scribing tool is mounted on the tool apron, the tool apron is matched with a built-in slide of the first sliding block, the electric cylinders drive the tool apron to slide left and right to adjust the telescopic length of the scribing tool, and the nose radius of the scribing tool is R3. According to the number of the scribed ridges and the shape of the rim, the stretching length of the scribing tool is adjusted to match them, and the up-down position of the scribing tool can be adjusted via the side cylinder to match the scribing position. When the wheel rotates, the first feeding cylinder is started to drive the scribing tool to be fed, and groove ridges can be scribed along a ring of the wheel; when the number of the ridges is more than three, the three ridges can be scribed first, and then ridges are increased after the height of the scribing tool is adjusted, so the flexibility is very high, and a variety number of groove ridges can be scribed according to needs. This is the rim scribing system, which completes groove ridge machining of the outer rim of the wheel.

The second support plate is fixed on the left of the frame, the two second guide rails are mounted on the bottom plane of the second support plate, the second feeding cylinder is fixed on the side of the second support plate, the output end of the second feeding cylinder is connected with the second sliding block, the second sliding block is mounted on the second guide rails, and the vision sensor is mounted at the front end of the second sliding block; when whether the groove ridges of the rim are continuous is detected, the vision sensor can be driven by the second feeding cylinder to approach the rim of the wheel to improve the recognition precision; and when the wheel is not detected, the vision sensor can leave the rim of the wheel. The scribing depth of a wheel of 15-18 inches is preferably 0.8 mm, and the scribing depth of a wheel of more than 19 inches is preferably 1.0 mm. When the machining allowance of the outer rim of a wheel blank is sufficient, the scribed ridge grooves are continuous; when the machining allowance of a blank having large deformation is insufficient, the scribed ridge grooves are discontinuous; whether the ridges are continuous can be recognized via the vision sensor, and then whether the outer rim of the wheel has sufficient machining allowance is judged; and when the machining allowance is insufficient, the blank is screened out off line. This is the vision detection system, which detects blanks having insufficient outer rim machining allowance.

The working process of the wheel blank outer rim scribing device is: firstly, according to the number of the scribed ridges and the shape of the rim, the stretching length of the scribing tool is adjusted to match them, and the up-down position of the scribing tool is adjusted via the side cylinder to match the scribing position. When the wheel is driven to rotate via the positioning and clamping system, the upper auxiliary system and the lower auxiliary system, the first feeding cylinder is started to drive the scribing tool to be fed, and groove ridges can be scribed along a ring of the wheel. After the ridges are machined, the wheel continuously rotates, the second feeding cylinder is started to drive the vision sensor to approach the rim of the wheel to recognize whether the ridges are continuous, thus judging whether the outer rim of the wheel has sufficient machining allowance; and when the machining allowance is insufficient, the wheel is screened out off line.

The device can be used for automatic continuous production. Through reasonable process layout and skilful design, the wheel positioning and clamping system, the upper auxiliary system, the lower auxiliary system, the rim scribing system and the vision detection system are organically combined together, so that not only are ridges scribed on the outer rim of a wheel, but also a blank having insufficient outer rim machining allowance can be checked out. An operator can fast distinguish similar blanks via the number of the ridges, thus avoiding machining accidents caused by mistakenly using the blanks; and the blank having insufficient machining allowance is screened out, and is thus prevented from entering a machining procedure to waste the machining resource.

Figure 1:
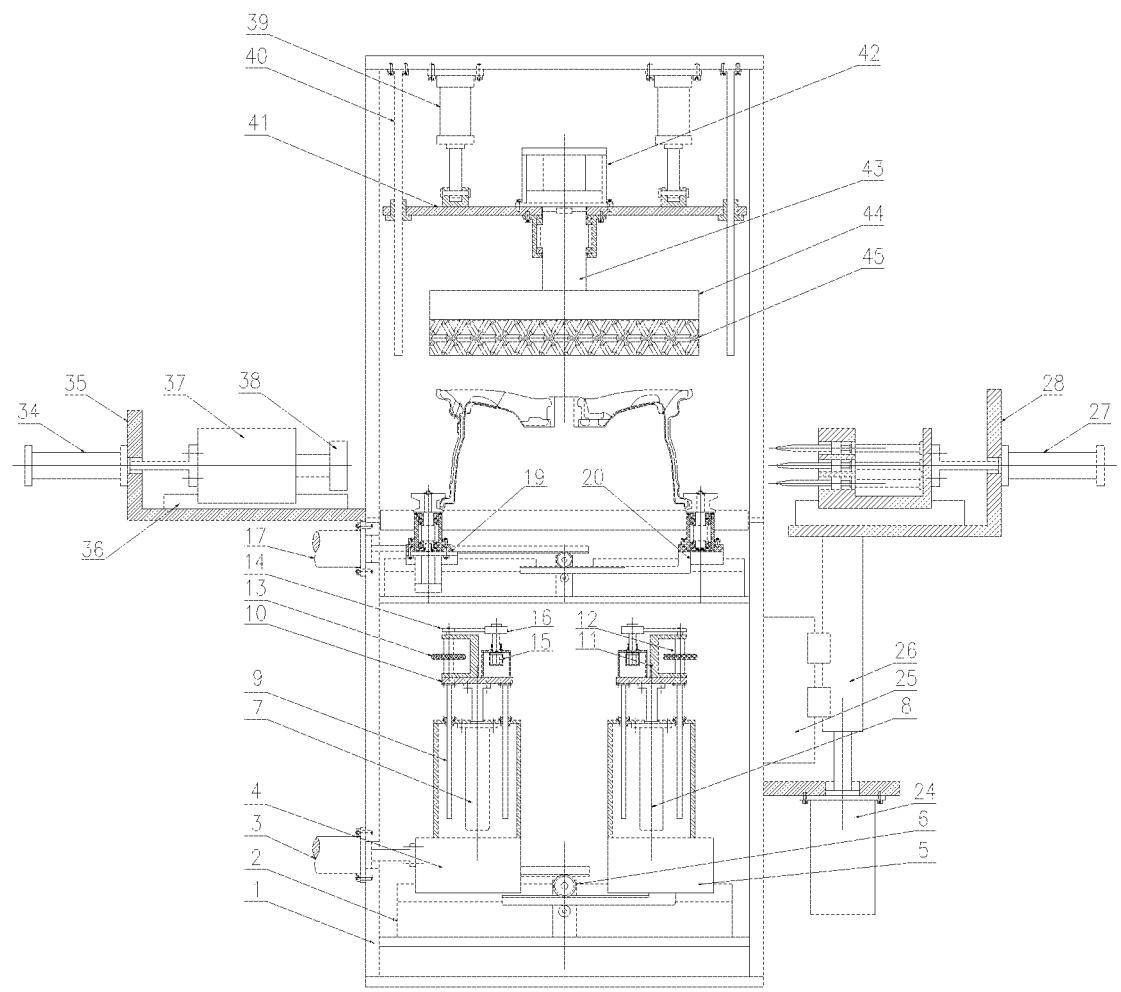
FIG. 1 is a front view of a wheel blank outer rim scribing device of the disclosure.
Figure 2:
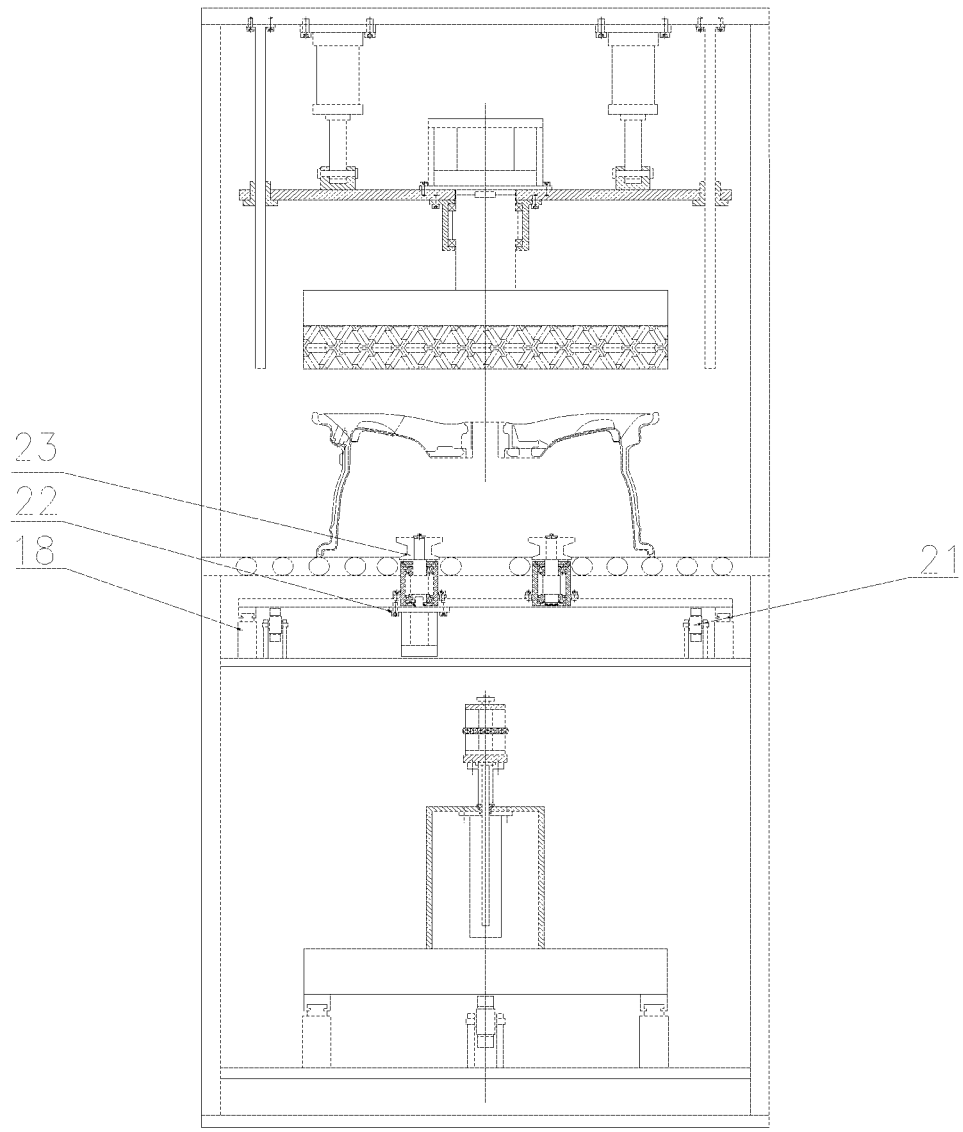
FIG. 2 is a left view of the wheel blank outer rim scribing device of the disclosure.
Figure 3:
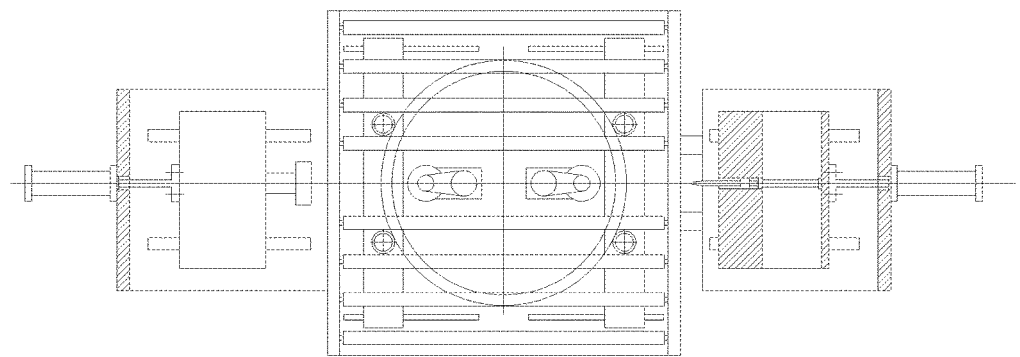
FIG. 3 is a top view of the wheel blank outer rim scribing device of the disclosure.
Figure 4:
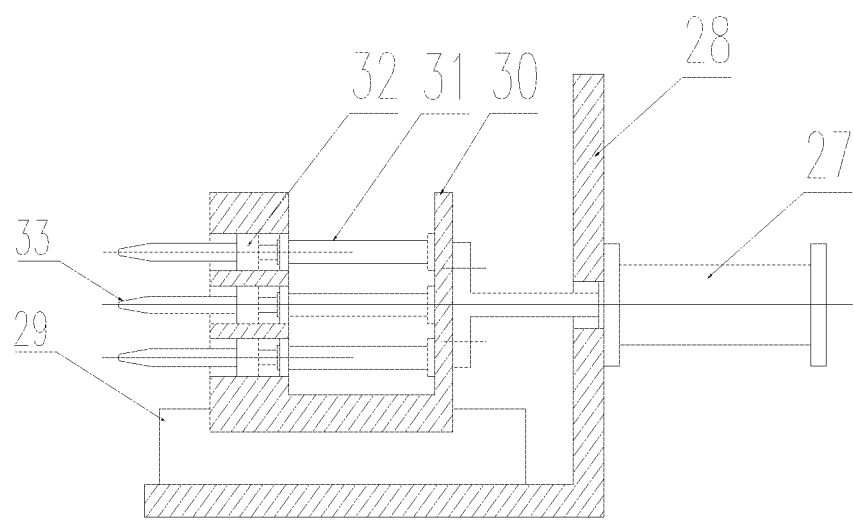
FIG. 4 is an enlarged view of a scribing tool system of the wheel blank outer rim scribing device of the disclosure.
Figure 5:
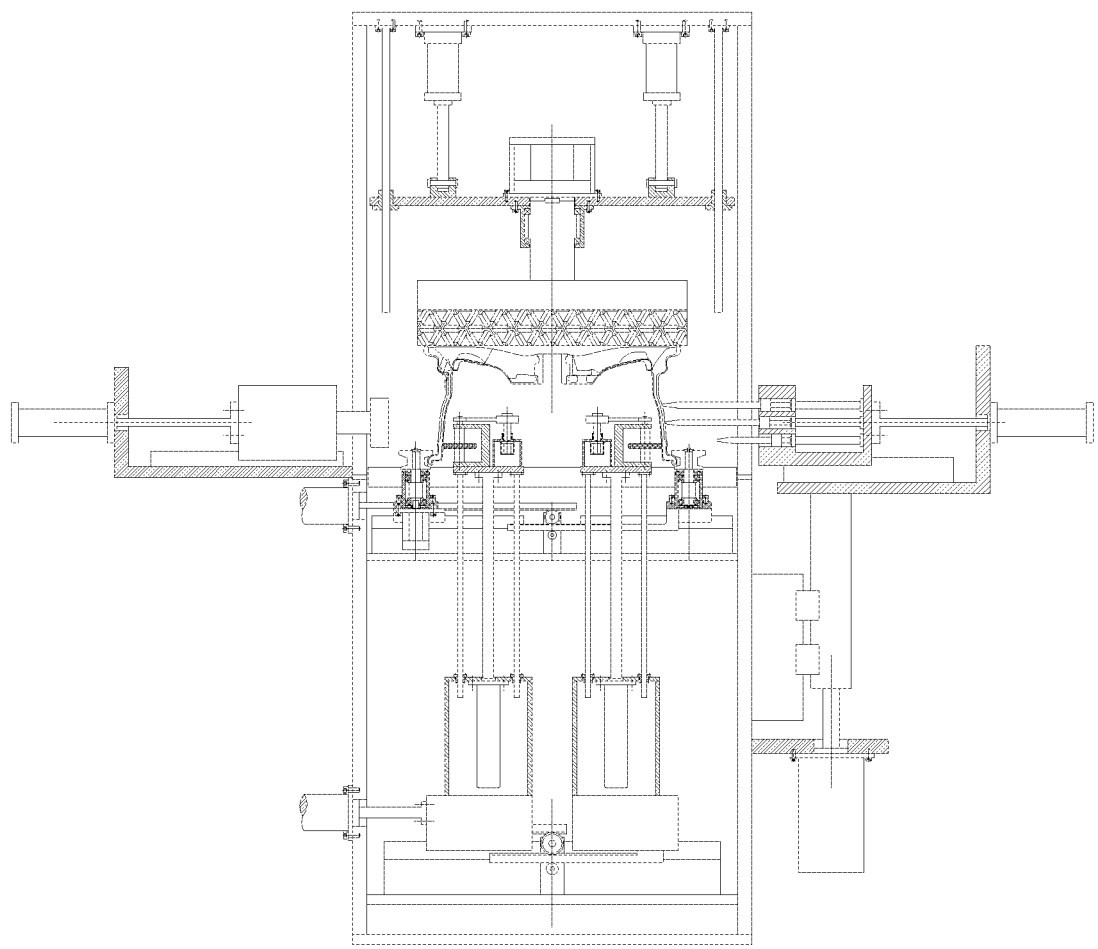
FIG. 5 is a schematic diagram when the wheel blank outer rim scribing device of the disclosure works.

LIST OF REFERENCE SYMBOLS 1 frame
2 adjusting guide rail
3 adjusting cylinder
4 left sliding table
5 right sliding table
6 first gear rack
7 left cylinder
8 right cylinder
9 first guide post
10 lifting table
11 roll shaft support
12 roll shaft
13 roller
14 driven wheel
15 servo motor
16 driving wheel
17 clamping cylinder
18 clamping guide rail
19 left sliding plate
20 right sliding plate
21 second gear rack
22 drive motor
23 clamping wheel
24 side cylinder
25 side guide rail
26 side lifting table
27 first feeding cylinder 28 first support plate
29 first guide rail
30 first sliding block
31 electric cylinder
32 tool apron
33 scribing tool
34 second feeding cylinder
35 second support plate
36 second guide rail
37 second sliding block
38 vision sensor
39 upper cylinder
40 second guide post
41 feeding platform
42 upper servo motor
43 shaft
44 rotating disk
45 pressure plate

DETAILED DESCRIPTION

Specific details and working conditions of a device provided by the disclosure will be given below in combination with the accompanying drawings.

A wheel blank outer rim scribing device is composed of a frame 1, an adjusting guide rail 2, an adjusting cylinder 3, a left sliding table 4, a right sliding table 5, a first gear rack 6, a left cylinder 7, a right cylinder 8, a first guide post 9, a lifting table 10, a roll shaft support 11, a roll shaft 12, a roller 13, a driven wheel 14, a servo motor 15, a driving wheel 16, a clamping cylinder 17, a clamping guide rail 18, a left sliding plate 19, a right sliding plate 20, a second gear rack 21, drive motors 22, clamping wheels 23, a side cylinder 24, a side guide rail 25, a side lifting table 26, a first feeding cylinder 27, a first support plate 28, first guide rails 29, a first sliding block 30, electric cylinders 31, a tool apron 32, a scribing tool 33, a second feeding cylinder 34, a second support plate 35, second guide rails 36, a second sliding block 37, a vision sensor 38, upper cylinders 39, second guide posts 40, a feeding platform 41, an upper servo motor 42, a shaft 43, a rotating disk 44 and a pressure plate 45.

The wheel blank outer rim scribing device is composed of a wheel positioning and clamping system, an upper auxiliary system, a lower auxiliary system, a rim scribing system and a vision detection system. The wheel positioning and clamping system completes positioning of a wheel on a roller bed, clamping and rotating drive; the upper auxiliary system improves the axial positioning precision and power assisting rotation of the wheel; the lower auxiliary system improves the radial positioning precision and power assisting rotation of the wheel; the rim scribing system completes groove ridge machining of the outer rim of the wheel; and the vision detection system detects blanks having insufficient outer rim machining allowance, and the five systems are organically combined together to jointly machine ridges on the outer rim of a wheel blank.

The output end of the clamping cylinder 17 is connected with the left sliding plate 19, the left sliding plate 19 and the right sliding plate 20 are mounted on the clamping guide rail 18 and connected with each other via the second gear rack 21, two drive motors 22 are mounted on both the left sliding plate 19 and the right sliding plate 20, and a clamping wheel 23 is mounted at the output end of each drive motor 22. When the clamping cylinder 17 drives the left sliding plate 19 to move, the right sliding plate 20 moves synchronously under the action of the second gear rack 21, so that the wheel can be positioned and clamped by the four clamping wheels 23; the drive motors 22 drive the clamping wheels 23 to rotate, and the wheel can be driven to rotate under the action of friction. This is the wheel positioning and clamping system, which completes positioning of the wheel on the roller bed, clamping and rotating drive.

The four upper cylinders 39 are fixed right above the frame 1, and the output ends of the cylinders are connected with the feeding platform 41 to control the feeding platform 41 to move up and down under the action of the second guide posts 40. The upper servo motor 42 is mounted on the feeding platform 41, the output end of the upper servo motor 42 is connected with the rotating disk 44, and the plastic pressure plate 45 is fixed on the rotating disk 44. After the wheel is positioned and clamped via the positioning and clamping system, the upper cylinders 39 are started to drive the pressure plate 45 to move down, and the lip end face of the wheel is compressed by the pressure plate 45, so that axial run-out of the wheel is eliminated, and the axial positioning precision of the wheel is improved; and the upper servo motor 42 drives the pressure plate 45 to rotate, thus assisting the wheel in rotating. This is the upper auxiliary system, which improves the axial positioning precision and power assisting rotation of the wheel.

The output end of the adjusting cylinder 3 is connected with the left sliding table 4, and the left sliding table 4 and the right sliding table 5 are mounted on the adjusting guide rail 2 and connected with each other via the first gear rack 6; the left cylinder 7 is mounted on the left sliding table 4 and controls the lifting table 10 to move up and down under the guidance of the first guide post 9, the roll shaft support 11 is fixed on the lifting table 10, the roll shaft 12 is mounted on the roll shaft support 11, and the roller 13 is mounted on the roll shaft 12. The servo motor 15 is fixed on the lifting table 10, the driving wheel 16 is mounted at the output end of the servo motor 15, the driven wheel 14 is mounted on the roll shaft 12, and the driving wheel 16 is connected with the driven wheel 14 via a drive belt. The structures on the right sliding table 5 and the left sliding table 4 are completely identical, the left cylinder 7 and the right cylinder 8 are simultaneously started to drive the left roller and the right roller to synchronously ascend to the inner rim of the wheel, the adjusting cylinder 3 is started to drive the left sliding table 4 and the right sliding table 5 to move synchronously, and the rollers on the two sides contact the inner rim of the wheel, so that radial positioning of the wheel is strengthened and the radial positioning precision of the wheel is improved; and the servo motor 15 drives the roller 13 to rotate, thus assisting the wheel in rotating. This is the lower auxiliary system, which improves the radial positioning precision and power assisting rotation of the wheel.

The side cylinder 24 is mounted on the right of the frame 1, the output end of the side cylinder 24 is connected with the side lifting table 26, the side cylinder 24 controls the up-and-down motion of the side lifting table 26 under the guidance of the side guide rail 25, the first support plate 28 is fixed on the side lifting table 26, the two first guide rails 29 are fixed on the bottom plane of the first support plate 28, the first feeding cylinder 27 is fixed on the side of the first support plate 28, the output end of the first feeding cylinder 27 is connected with the first sliding block 30, the first sliding block 30 is mounted on the first guide rails 29, the three electric cylinders 31 are fixed on the first sliding block 30 at equal intervals from top to bottom, the output ends of the electric cylinders 31 are connected with the tool apron 32, the scribing tool 33 is mounted on the tool apron 32, the tool apron 32 is matched with a built-in slide of the first sliding block 30, the electric cylinders 31 drive the tool apron 32 to slide left and right to adjust the telescopic length of the scribing tool 33, and the nose radius of the scribing tool 33 is R3. According to the number of the scribed ridges and the shape of the rim, the stretching length of the scribing tool 33 is adjusted to match them, and the up-down position of the scribing tool 33 can be adjusted via the side cylinder 24 to match the scribing position. When the wheel rotates, the first feeding cylinder 27 is started to drive the scribing tool 33 to be fed, and groove ridges can be scribed along a ring of the wheel; when the number of the ridges is more than three, the three ridges can be scribed first, and then ridges are increased after the height of the scribing tool is adjusted, so the flexibility is very high, and a variety number of groove ridges can be scribed according to needs. This is the rim scribing system, which completes groove ridge machining of the outer rim of the wheel.

The second support plate 35 is fixed on the left of the frame 1, the two second guide rails 36 are mounted on the bottom plane of the second support plate 35, the second feeding cylinder 34 is fixed on the side of the second support plate 35, the output end of the second feeding cylinder 34 is connected with the second sliding block 37, the second sliding block 37 is mounted on the second guide rails 36, and the vision sensor 38 is mounted at the front end of the second sliding block 37; when whether the groove ridges of the rim are continuous is detected, the vision sensor 38 can be driven by the second feeding cylinder 34 to approach the rim of the wheel to improve the recognition precision; and when the wheel is not detected, the vision sensor 38 can leave the rim of the wheel. The scribing depth of a wheel of 15-18 inches is preferably 0.8 mm, and the scribing depth of a wheel of more than 19 inches is preferably 1.0 mm. When the machining allowance of the outer rim of a wheel blank is sufficient, the scribed ridge grooves are continuous; when the machining allowance of a blank having large deformation is insufficient, the scribed ridge grooves are discontinuous; whether the ridges are continuous can be recognized via the vision sensor 38, and then whether the outer rim of the wheel has sufficient machining allowance is judged; and when the machining allowance is insufficient, the blank is screened out off line. This is the vision detection system, which detects blanks having insufficient outer rim machining allowance.

The working process of the wheel blank outer rim scribing device is: firstly, according to the number of the scribed ridges and the shape of the rim, the stretching length of the scribing tool 33 is adjusted to match them, and the up-down position of the scribing tool 33 is adjusted via the side cylinder 24 to match the scribing position. When the wheel is driven to rotate via the positioning and clamping system, the upper auxiliary system and the lower auxiliary system, the first feeding cylinder 27 is started to drive the scribing tool 33 to be fed, and groove ridges can be scribed along a ring of the wheel. After the ridges are machined, the wheel continuously rotates, the second feeding cylinder 34 is started to drive the vision sensor 38 to approach the rim of the wheel to recognize whether the ridges are continuous, thus judging whether the outer rim of the wheel has sufficient machining allowance; and when the machining allowance is insufficient, the wheel is screened out off line.

The device can be used for automatic continuous production. Through reasonable process layout and skilful design, the wheel positioning and clamping system, the upper auxiliary system, the lower auxiliary system, the rim scribing system and the vision detection system are organically combined together, so that not only are ridges scribed on the outer rim of a wheel, but also a blank having insufficient outer rim machining allowance can be checked out. An operator can fast distinguish similar blanks via the number of the ridges, thus avoiding machining accidents caused by mistakenly using the blanks; and the blank having insufficient machining allowance is screened out, and is thus prevented from entering a machining procedure to waste the machining resource.

The invention claimed is:

1. A wheel blank outer rim scribing device, being composed of a frame, an adjusting guide rail, an adjusting cylinder, a left sliding table, a right sliding table, a first gear rack, a left cylinder, a right cylinder, a first guide post, a lifting table, a roll shaft support, a roll shaft, a roller, a driven wheel, a servo motor, a driving wheel, a clamping cylinder, a clamping guide rail, a left sliding plate, a right sliding plate, a second gear rack, drive motors, clamping wheels, a side cylinder, a side guide rail, a side lifting table, a first feeding cylinder, a first support plate, first guide rails, a first sliding block, electric cylinders, a tool apron, a scribing tool, a second feeding cylinder, a second support plate, second guide rails, a second sliding block, a vision sensor, upper cylinders, second guide posts, a feeding platform, an upper servo motor, a shaft, a rotating disk and a pressure plate, wherein the first feeding cylinder is fixed on the side of the first support plate, the output end of the first feeding cylinder being connected with the first sliding block, the first sliding block being mounted on the first guide rails, the three electric cylinders being fixed on the first sliding block at equal intervals from top to bottom, the output ends of the electric cylinder being connected with the tool apron, the scribing tool being mounted on the tool apron, the tool apron being matched with a built-in slide of the first sliding block, the electric cylinders driving the tool apron to slide left and right to adjust the telescopic length of the scribing tool, and the nose radius of the scribing tool being R3.

2. The wheel blank outer rim scribing device according to claim 1, wherein the second support plate is fixed on the left of the frame, the two second guide rails are mounted on the bottom plane of the second support plate, the second feeding cylinder is fixed on the side of the second support plate, the output end of the second feeding cylinder is connected with the second sliding block, the second sliding block is mounted on the second guide rails, and the vision sensor is mounted at the front end of the second sliding block; when whether groove ridges of a rim are continuous is detected, the vision sensor can be driven by the second feeding cylinder to approach the rim of the wheel to improve the recognition precision.

* * * * *